United States Patent
Harbers, Jr. et al.

[11] 3,785,673
[45] Jan. 15, 1974

[54] PRELOADED SPRING BEAM AND METHOD EMPLOYED ALONE OR IN COMBINATION WITH AIR BELLOWS SPRING

[75] Inventors: Henry C. Harbers, Jr., Huntington Beach; Henry C. Harbers, Sr., Pasadena, both of Calif.

[73] Assignee: Western Unit Corporation, City of Industry, Calif.

[22] Filed: Sept. 20, 1971

[21] Appl. No.: 182,014

[52] U.S. Cl. .............................. 280/124 F, 267/48
[51] Int. Cl. ............................................. B60g 11/28
[58] Field of Search .................... 280/124 F, 124 R; 267/48, 52

[56] References Cited
UNITED STATES PATENTS

| | | | |
|---|---|---|---|
| 3,580,347 | 5/1971 | McGee | 280/124 R |
| 3,490,758 | 1/1970 | Foster | 280/124 R |
| 2,973,196 | 2/1961 | Scheublein et al. | 267/48 |
| 3,233,915 | 2/1966 | Hamlet | 280/124 F |
| 2,928,669 | 3/1960 | Lenet | 267/48 |

*Primary Examiner*—Philip Goodman
*Assistant Examiner*—John A. Carroll
*Attorney*—R. Wilton Whann et al.

[57] ABSTRACT

A preloaded spring beam having a short portion of its length held resiliently deformed in a manner to increase its load sustaining capabilities substantially. In one typical application the spring beam is employed in a vehicle suspension assembly, either alone or in combination with other spring means, such as regulatable air bellows spring means. The spring beam typically comprises a single spring leaf of the single or double cantilever type and preloaded in an area immediately opposite its anchorage to its fixed support utilizing a specially constructed high strength preloading device or shim between the beam and support effective to store high value preloading stresses in the beam as an incident to the clamping thereof to its support. When used in combination with a regulatable air spring, the suspension assembly provides a soft ride under both dead load and under wide range live loading conditions and, in addition, assures superior sway and stabilizing control of the associated carriage unit.

26 Claims, 6 Drawing Figures

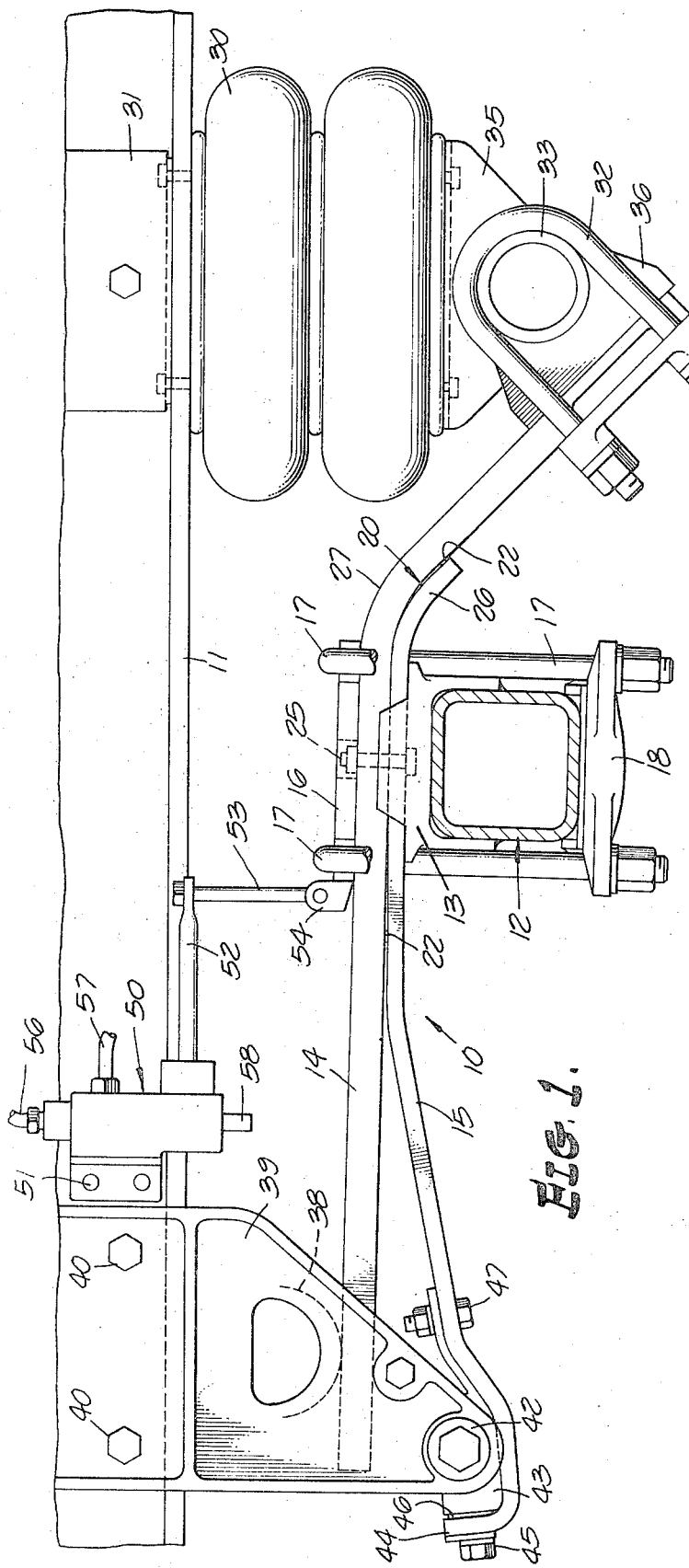

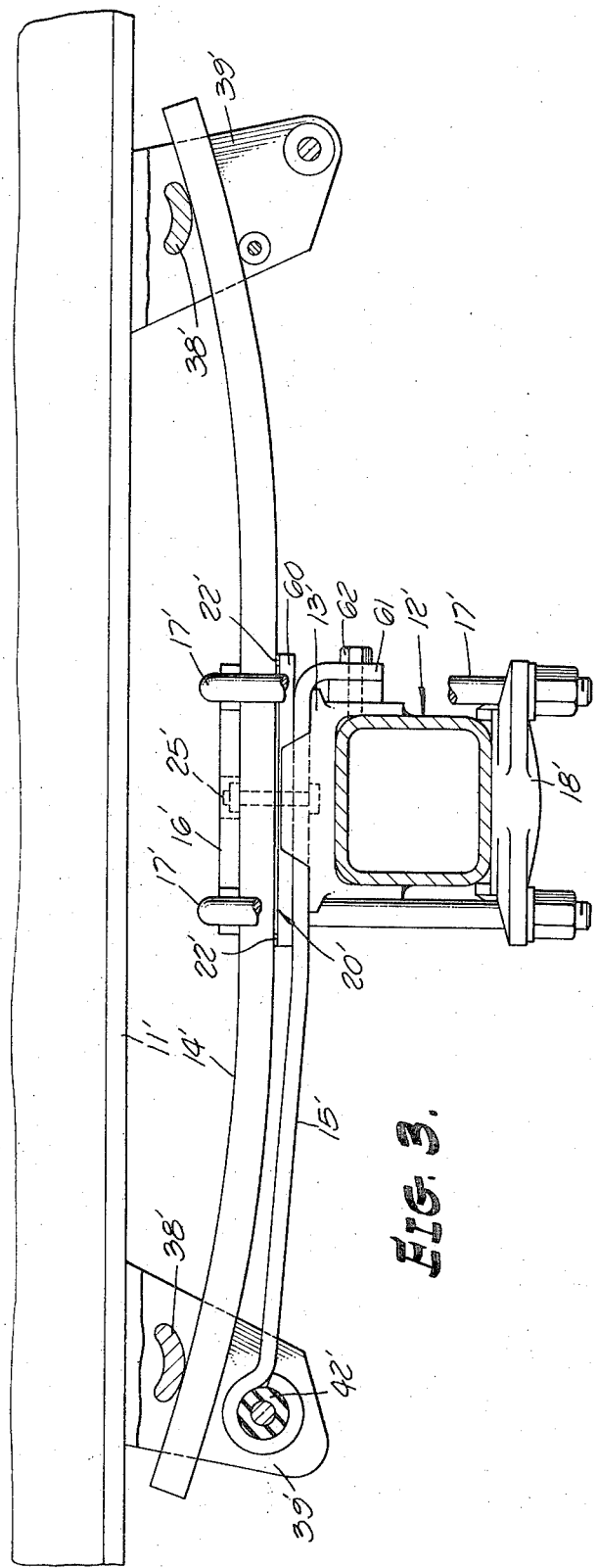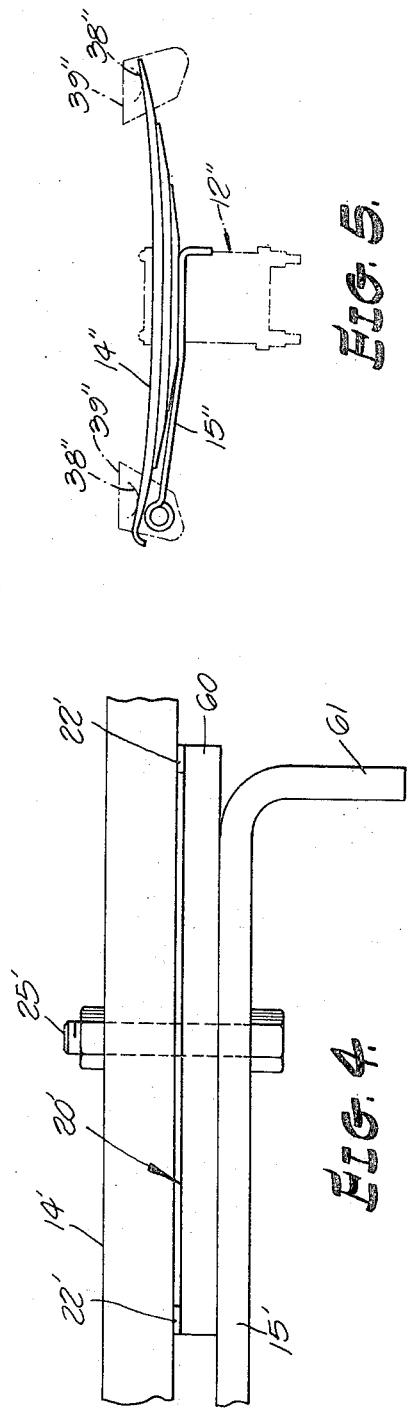

PRELOADED SPRING BEAM AND METHOD EMPLOYED ALONE OR IN COMBINATION WITH AIR BELLOWS SPRING

This invention relates to spring beam and more particularly to an improved beam and method of assembling the same to preload the beam whether employed alone or in combination with air spring means and exhibiting unique and highly desirable properties including high capacity but low weight, wide range soft ride characteristics, and superior stability and sway control.

Much time and effort has been expended by designers over many years to improve the characteristics of spring suspension assemblies wherever used and, in particular, to reduce the weight and cost while improving the load carrying and resiliency characteristics. One approach meeting these requirements in substantial degree has employed multiple leaf means in combination with an air bellows spring. By this means the loading range over which a soft ride can be achieved is extended markedly but with certain attendant disadvantages. For example, multiple leaf spring constructions are more costly, add substantially and undesirably to the weight and pose serious problems if it is desired to shape the individual leaves owing to the extreme difficulty and cost of bending the individual leaves precisely to the same contour.

Proposals have been made to employ a single tapered leaf of the requisite size to provide the most efficient design characteristics. Theoretically, such a spring can be tailored to meet exacting requirements but from a practical manufacturing standpoint it is found that such springs are extremely difficult if not impossible to heat treat in a satisfactory manner owing to the differing cross sectional areas in different zones lengthwise of a tapering leaf.

The present invention successfully avoids the numerous shortcomings and limitations of prior suspension assemblies both as respects a spring beam per se and in combination with air spring bellows. Not only is the overall weight of the assembly reduced but the strength of the assembly is markedly increased. This is accomplished by the precision preloading of the spring beam whether used in a single or a double cantilever configuration and performed inexpensively in an exceedingly simple and highly reliable manner. The very substantial increase in spring rate so obtained is especially advantageous when the beam is used as a part of a composite beam and air bellows spring assembly. This is because the high spring rate characteristic can be employed to greatly improve sway and tilt control and the stabilizing characteristics of a high rate beam when employed trailing-arm fashion and as a part of a beam air bellows suspension assembly. The high spring rate is also highly advantageous when incorporated in a trailing arm elliptical spring beam suspension assembly.

Typically the preloaded spring beam comprises a single leaf of uniform cross section which is easily bent to any desired shape and preloaded to a desired degree with foreknowledge that the spring will exhibit uniform characteristics from end to end can be precisely preloaded as a single component rather than parts of a multi-leaf assembly the shape of the separate internested portions of which it is so difficult and impractical to control with any degree of precision. When the preloaded beam is used in combination with an air spring the latter is readily and automatically regulatable to provide soft ride for both dead and all live load conditions using a load responsive device to regulate the air pressure of the air spring.

The preloading can be accomplished in numerous ways but simply and inexpensively by sandwiching a preloading shim between the spring beam and a fixed support as, for example, a short length of a spring steel plate. The shim is so designed that a portion of the spring beam between low-height fulcrums at the opposite ends of the preload shim permit predetermined deformation of the spring beam as an incident to the clamping of the beam to its support. Typically but not necessarily, the preloading is done against a stiff spring leaf employed as the draft linkage interconnecting the carriage axle housing and a rigid hanger secured to the vehicle frame and designed to limit movement of the draft linkage to a vertical plane. The height of the fulcrums carried by the preloading shim can be accurately controlled thereby determining with precision the degree of preloading imparted to a spring beam as it is clamped to its support in a manner to close the initial gap between the center of the shim and the juxtaposed surface of the beam.

Accordingly it is a primary object of the present invention to provide an improved preloaded spring beam and method of assembling the same.

Another object of the invention is the provision of an improved lighter-weight high-strength suspension assembly employing a trailing arm spring beam preloaded to increase the spring rate thereof.

Another object of the invention is the provision of a trailing arm preloaded spring beam in combination with an air bellows spring operable to provide a soft ride under both dead and widely variable live weight conditions.

Another object of the invention is the provision of a composite spring beam air-bellows suspension assembly having greatly improved anti-sway and stability characteristics coupled with reduced weight and superior operating characteristics.

Another object of the invention is the provision of a method and construction for preloading spring beams to increase the spring rate of the beam.

Another object of the invention is the provision of means for selectively preloading a spring beam to one of several different known values depending on which one of a plurality of different size preloading shims is employed when securing the beam to support means therefor.

Another object of the invention is the provision of a plurality of preload shims of different sizes selectively usable in securing a spring beam to a fixed support thereby to determine the degree of preloading achieved in the assembled condition of the beam.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view partly in section showing a preferred embodiment of the invention employed in a suspension assembly of a vehicle carriage unit;

FIG. 2 is a perspective view of a set of preloading shims one of which is employed in FIG. 1;

FIG. 2A is a fragmentary view of the spring beam and draft linkage subassembly with a selected preloading shim in place therebetween;

FIG. 3 is a side elevational view with parts broken away showing a second embodiment of the invention suspension assembly;

FIG. 4 is a fragmentary enlarged view of the preloading zone of a spring beam and draft link subassembly prior to preloading; and FIG. 5 is a side elevational view, partly in phantom, of a conventional prior art multi-leaf spring beam assembly and having operating characteristics contrasting with those of the FIG. 3 construction.

Referring initially more particularly to FIGS. 1, 2 and 2A, there is shown one preferred embodiment of the present invention as typically embodied in a vehicle carriage assembly, designated generally 10, and underlying the main frame 11 of a typical vehicle chassis. Since carriage units for vehicles are well known, only the axle housing 12 is here shown and understood as extending crosswise of main frame 11 and similarly provided at its other end with a duplicate suspension assembly. Rigidly anchored to this housing on a typical cast steel seat 13 is a single spring beam 14 and a typical spring leaf draft linkage 15. This beam is held rigidly clamped to the axle housing by a pressure plate 16 overlying the spring beam, a pair of U-bolt clamps 17,17 and a clamping plate 18 bearing against the underside of the axle housing. Although beam 14 is here shown as secured to the top side of the axle housing, it will be understood that it may be clamped to the underside if so desired.

Spring beam 14 preferably comprises a single wide spring leaf of suitable thickness, such as one inch, although it will be understood that the thickness can vary both above and below this typical value. In order to preload beam 14 to increase its spring rate load capacity very materially, there is interposed between the beam and its fixed support or, in the assembly here illustrated, the stiffly resilient draft link member 15, a preloading shim 20. It will be understood that the physical and structural equivalents of the preloading shim can be obtained by suitably forming either the beam itself, or a separate plate with fulcrum means spaced slightly outboard of either side of the axle housing or other rigid support to which it is clamped. However, these features are most economically and suitably achieved by using a separate preloading member 20 which is readily and economically manufactured to precise dimensions important to the accurate and precise preloading of beam 14.

As here shown, each shim member comprises a short strip of flexible material having a main body 21 corresponding in width to the width of beam 14 and having a length spanning beyond the leading and trailing sides of the rigid support to which it is to be clamped, such as the axle housing 12. The opposite transverse ends of each shim 20 of a set thereof have pressure pads or strips 22 of different predetermined thickness adequate to impart a desired preload stress to the spring beam when properly assembled in its operating environment. This height is of the order of 15 to 40 mils, or even greater, and adequate to store high value preloading stresses in the spring beam when the gap is closed by tightening the assembly clamping members, as the U-bolts 17,17.

Preloading member 20 is preferably made of nonmetallic material, such as high strength molded polyester fiberglass. A laminated material of this type found highly satisfactory as a preloading shim is designated CE-578 Phenolite Laminated PLastic, and is available from NVF Company, Yorklyn, Delaware 19736. A shim of this material having a main body 30 mils thick and fulcrum strips 30 mils thick at its ends was employed to preload the spring shown in FIG. 1 to exhibit a spring rate of 10,390 lbs. per inch.

In a typical installation the spring draft link 15 and preloading shim 20 are held in preliminary assembly by bolt 25. The strength of this bolt is merely adequate to hold the parts firmly in alignment with one another until clamped to the axle housing or other support. It will be understood that draft link 15 is preferably of stiff spring stock having a width corresponding to that of beam 14 and having its trailing end bent at 26 to conform with the shape of the apex portion 27 of the V-shape beam 14. As herein shown, the leading end of beam 14 is inclined upwardly only slightly from the horizontal at its leading end, whereas its trailing leg is inclined downwardly at an angle of approximately 45°. However, it will be understood that other shapes and dispositions of the beam legs may be adopted and fall within the scope of the present invention.

When assembled as shown the downwardly inclined rear end of beam 14 provides adequate room to accomodate the air bellows spring 30 having its upper end clamped to frame 11 by clamping assembly 31 and its lower end rigidly clamped to beam 14 by U-bolts 32 and an intervening stabilizer tube 33 extending crosswise of the vehicle and having a similar clamping relationship with the spring beam along the other side of the vehicle. Stabilizer tube 33 provides a pivotal support for a bracket 35 at the lower end of each of the air springs and is clamped to the spring beam via a bracket 36 held clamped to the beam by U-bolts 32.

The forward end of beam 14 underlies a round-surfaced cross support 38 integral with the legs of a U-shaped hanger bracket 39 secured to chassis frame 11 by bolts 40. It will be understood that the legs of bracket 39 snugly embrace the lateral edges of beam 14 in well known manner and that the leading end of draft link 15 is pivotally connected to the lower end of bracket 39 by a resilient bushing assembly 42 extending through a casting 43 held assembled to the upturned end 44 of the draft link by cap screw 45. Usually one or more shims 46 are interposed between end 44 of the draft link and member 43 to provide for the accurate alignment of the carriage axle housing normal to the length of the vehicle frame. The rear end of casting 43 is held to the draft link by bolts 47. It will therefore be clear that hanger 39 holds the forward end of beam 14 in assembled position and rigidly against lateral movement crosswise of the vehicle but free to pivot through a limited vertical arc about the axis of the bushing assembly 42.

Means for automatically sensing and regulating the air supply to air bellows 30 to provide a soft ride for both dead and live loads includes a well known automatic levelling valve 50, such as that disclosed in Harbers et al U.S. Pat. No. 3,063,732 granted Nov. 15, 1962. This valve is rigidly secured to the vehicle frame by fasteners 51. Pivotally supported and projecting rearward from valve 50 is an operating lever 52 secured to a pivoting link 53 having its lower end connected to the pressure plate 16 via bracket 54.

Pressurized air is supplied to the upper end of the valve through a hose 56. Normally a servo valve housed within the casing of the valve is closed and air can neither escape from bellows 30 nor be supplied thereto from supply hose 56. However, if the self-levelling valve senses a change of loading on the suspension assembly, control lever 52 pivots upwardly or downwardly from its normal neutral position. If lever 52 pivots upwardly, an increase in live loading is indicated and the servo valve is operated to supply additional pressurized air to air spring 30 through hose 57. When sufficient air has been admitted to restore lever 52 to its neutral position, further air supply is cut off. However, if loading is removed, control lever 52 pivots downwardly operating the servo valve to release air from the bellows through hose 57 and to the atmosphere through the air vent tube 58.

Referring now more particularly to FIGS. 3 and 4, there is shown a second embodiment of a preloaded spring beam likewise employed as a suspension for a vehicle carriage unit having an axle housing 12'. The same or similar components of the second embodiment are designated by similar reference characters as in the first embodiment but distinguished therefrom by the addition of a prime. In this construction, the single spring leaf beam 14' is of elliptical configuration with its opposite ends extending forwardly and rearwardly of axle housing 12' and having a short length of its mid-portion anchored in highly preloaded condition to the axle housing by the U-bolts 17'. As in the first described embodiment, the pressure is applied by these U-bolts inwardly of the fulcrum strips 22' crosswise of the opposite ends of the main body of the preloading shim 20'. In this case a shim 20' is supported throughout its underside by a heavy duty pressure plate 60, this plate and the shim being held in assembled position against the underside of beam 14' by the underlying draft link 15' and the assembly bolt 25'. Assembly bolt 25' applies very little preloading pressure to the assembly but does hold the parts preassembled with draft link 15' lying parallel to the leading half of beam 14'. The trailing end of draft link 15' is here shown as turned downwardly at 61 and held clamped by cap screws 62 to the spring seat member 13'. It will be understood that U-bolts 17' are tightly clamped and under high stress adequate to bow the intervening portions of spring beam 14' into high pressure contact with the underlying portion of shim 20'. It will be readily apparent that strips 22' act as fulcrums during the preloading of the spring beam. The downward bowing of the portion of the beam between the two fulcrums causes the outer end of the beam to flex upwardly as they are preloaded so that they are highly stressed and are thereby enabled to support a considerably higher load then before being preloaded. The vehicle load is transmitted to the outer ends of the preloaded beam through the bearing member 38',38', it being understood that the lateral edges of the beam have a snug fit between the inverted legs of the U-shape hanger bracket 39'. Accordingly the carriage axle assembly is held very firmly and positively against lateral movement even though virtually floatingly supported on the outer ends of beam 14'.

Illustrative of the superior characteristics and advantages of the invention preloaded spring suspension assembly are the following data presented with respect to the assemblies illustrated in FIGS. 1, 3 and 5. Each of these three suspension assemblies is appropriately designed to exhibit similar spring rates but with the FIG. 5 construction representing a typical multi-leaf prior art construction without preloading.

FIG. 5 differs from the other constructions in that resiliency is obtained by multiple leaf spring beam 14" underlying the bearing cross pieces 38", the mid portions of the multi-leaf spring beam being securely anchored to the axle housing 12". The draft connection between the forward hanger bracket 39" and the axle housing is provided by a spring leaf linkage member 15".

TABLE I

| Factor | Fig. 1 | Fig. 3 | Fig. 5 |
|---|---|---|---|
| Weight of Beam Approximately...... | 62# | 50# | 70# |
| Spring Rate............. | 10,390#/in. | 12,000#/in. | 11,500#/in. |
| Stress (design)......... | 68,000 psi. | 140,000 psi. | 71,900 psi. |

The significant characteristics of the three assemblies are contrasted in Table I. Thus it will be noted that the weight of the three beams for FIGS. 1, 3 and 5 are 62 lbs. and 50 lbs. for the respective preloaded single leaf constructions, and 70 lbs. for the equivalent multi-leaf construction shown in FIG. 5. The spring rates for the three constructions differ in no major degree but the load carrying capabilities of the three differ quite materially. Thus, the FIG. 1 construction carries its rated load with a stress on the spring beam of a maximum of 60,000 psi. The FIG. 3 construction has a high but quite acceptable stress in its single beam but lacks soft ride capabilities owing to the absence of an air spring. The FIG. 5 construction likewise lacks soft ride capabilities for want of an air spring and has a stress well below tolerable limits.

While the particular preloaded spring beam and method employed alone or in combination with air bellows spring herein shown or disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A preloaded spring beam assembly comprising an elongated spring beam, rigid support means for said spring beam, and clamping means for anchoring said spring beam to said rigid support in a manner to prestress said spring beam in a relatively small portion of the length thereof as an incident to the tightening of said clamping means thereby to store energy thereafter available to counteract loading applied to said spring beam in an area spaced from the prestressed portion thereof.

2. A spring beam as defined in claim 1 characterized in that said anchoring and prestressing means includes means for forcibly locking a limited length of said spring beam deformed thereby to store stress therein effective to counteract loading applied to said spring beam at a point displaced from said deformed portion.

3. A spring beam as defined in claim 2 characterized in that said means for prestressing said spring beam comprises means interposed between said spring beam and said rigid support and effective to support said spring beam in an unstressed condition from a pair of fulcrum-like support areas spaced from one another lengthwise of said beam, and said anchoring means being effective as it is tightened to prestress said spring beam by deforming that portion of said beam lying between said pair of fulcrum-like support areas.

4. A spring beam as defined in claim 2 characterized in that said means for prestressing said spring beam comprises preloading shim means interposed between said beam and said support means and including strip means of high compressive strength supporting a pair of low-height fulcrums spaced to either side of the mid portion of said support means and between said support means and said beam and so as to provide a gap of predetermined height between said center portion and the juxtaposed portion of said beam before said anchoring means is tightened, and the tightening of said anchoring means being effective to close said gap thereby to prestress said spring beam and flex the remote free end thereof.

5. A spring beam as defined in claim 4 characterized in that said thin strip means is non-metallic and formed in one elongated unitary piece having said low height fulcrums at its opposite ends lying crosswise of said beam and a relatively thin intermediate main body portion.

6. A spring beam as defined in claim 5 characterized in that the opposite ends of said shim means are positioned substantially equidistantly from the mid portion of said support means and closely beyond the opposite sides thereof.

7. A spring beam as defined in claim 4 characterized in that said anchoring is tightened sufficiently to deflect a major portion of said spring beam between the thickened ends of said shim means into pressurized contact with the juxtaposed portion of said shim means.

8. A spring beam as defined in claim 1 characterized in that the opposite ends thereof project in opposite directions from either side of said anchoring means, and the tightening of said anchoring means being effective to flex the outer ends of said beam in opposite directions as said beam is prestressed.

9. A spring beam as defined in claim 1 characterized in that said anchoring means includes draft link means extending along the length of said spring beam and having one end firmly connected to said support means and its other end terminating adjacent one end of said beam and adapted to be connected to a load carrying member being suspended on said spring beam.

10. A spring beam as defined in claim 9 characterized in that said draft linkage and said spring beam are held to said support means by said anchor means.

11. A spring beam as defined in claim 1 characterized in that the opposite ends of said beam are generally symmetrical.

12. A spring beam as defined in claim 1 characterized in that said beam projects substantially equidistaintly from the opposite sides of said rigid support.

13. A spring beam as defined in claim 12 characterized in the provision of draft link means closely spaced beside one end half of said beam and comprising a stiff strip of resilient spring stock having one end anchored to said rigid support and its other end terminating adjacent one end of said spring beam and adapted to be movably connected to a vehicle chassis.

14. A spring beam as defined in claim 1 characterized in that said spring beam comprises a single leaf of the same cross section throughout the load bearing portion thereof and projecting substantially the same distance from the opposite sides of said fixed support.

15. A spring beam as defined in claim 14 characterized in that said spring beam is generally elliptical in shape lengthwise thereof.

16. A preloaded spring suspension assembly for a vehicle chassis comprising an elongated spring beam, means for rigidly anchoring said beam to carriage axle means including means for preloading a relatively short length of said beam immediately adjacent said axle means to flex at least one end portion of said beam away from the ground and toward the load to be supported thereon as an incident to rigidly clamping said spring beam to said axle means thereby to prestress said beam and increase the load supporting ability thereof, and means for connecting said axle means to the vehicle with a load carrying portion thereof operatively connected to a free end of said spring beam.

17. A suspension assembly as defined in claim 2 characterized in that said spring beam comprises a single elongated leaf of uniform cross section from end to end of the load carrying portion thereof.

18. A suspension assembly as defined in claim 17 characterized in that said single leaf spring beam is of V-shape lengthwise thereof and in that the apex portion thereof is pre-loaded and clamped to said axle means.

19. A suspension assembly as defined in claim 16 characterized in having air spring means interposed between the vehicle frame and said spring beam.

20. A suspension assembly as defined in claim 17 characterized in the provision of a high strength support between one face of said spring beam and said axle means, and said preloading means comprising elongated shim means having thickened ends sandwiched between the adjacent faces of said spring beam and said high strength support and cooperating with said anchoring means to deform and preload said spring beam as an incident to tightening said anchoring means.

21. A preloaded suspension assembly for a cargo vehicle having a chassis frame and providing high sway control stability coupled with low weight and a soft ride from no load to full load, said assembly comprising carriage axle means, trailing arm spring beam extending crosswise of said carriage axle means, means for rigidly anchoring said spring beam to said carriage axle means and including means for simultaneously preloading a relatively short length of said spring beam to flex a portion thereof away from the ground and toward the load to be supported thereon as an incident to the tightening of said anchoring means thereby to prestress said beam and increase the load supporting ability thereof, hanger means closely embracing the leading end of said beam and secured to said chassis frame, draft linkage means interconnecting said housing means and said hanger means and cooperating with said spring beam in stabilizing and counteracting sway forces, and air spring means interposed between said spring beam and said chassis frame and adapted to supplement the leading end thereof in supporting a load on said carriage axle means.

22. A preloaded suspension assembly as defined in claim 21 characterized in the provision of load sensing means connected between said chassis frame and carriage axle means and operatively connected to said air spring means to regulate the air pressure therein in proportion to the load supported by said suspension assembly.

23. A suspension assembly as defined in claim 22 characterized in that said spring beam and said air spring means cooperate in providing a soft ride for wide-range live loading supported by said suspension assembly.

24. A suspension assembly as defined in claim 23 characterized in that said spring beam comprises a single leaf of uniform cross section throughout the load supporting portion thereof.

25. A suspension assembly as defined in claim 24 characterized in that said spring beam is of V-shape lengthwise thereof with the leading end portion mounted generally horizontally and the trailing end portion extending downwardly and secured to the lower end of said air spring means.

26. A suspension assembly as defined in claim 21 characterized in that the preloading stresses present in said assembly are created therein by bowing a lengthwise portion of said beam as an incident to the assembly thereof to said axle housing means.

* * * * *